(12) United States Patent
Kwon et al.

(10) Patent No.: US 11,936,970 B2
(45) Date of Patent: Mar. 19, 2024

(54) OPTICAL DEVICE

(71) Applicant: LG INNOTEK CO., LTD., Seoul (KR)

(72) Inventors: Young Man Kwon, Seoul (KR); Kwang Hyun Ryoo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 111 days.

(21) Appl. No.: 17/277,588

(22) PCT Filed: Sep. 30, 2019

(86) PCT No.: PCT/KR2019/012734
§ 371 (c)(1),
(2) Date: Mar. 18, 2021

(87) PCT Pub. No.: WO2020/071707
PCT Pub. Date: Apr. 9, 2020

(65) Prior Publication Data
US 2022/0030143 A1 Jan. 27, 2022

(30) Foreign Application Priority Data
Oct. 2, 2018 (KR) .......................... 10-2018-0117762
Oct. 2, 2018 (KR) .......................... 10-2018-0117763

(51) Int. Cl.
*H04N 23/55* (2023.01)
*G02B 7/02* (2021.01)
*G03B 17/04* (2021.01)
*H04N 23/54* (2023.01)
*H04N 23/57* (2023.01)

(52) U.S. Cl.
CPC ............ *H04N 23/55* (2023.01); *G02B 7/022* (2013.01); *G03B 17/04* (2013.01); *H04N 23/54* (2023.01); *H04N 23/57* (2023.01)

(58) Field of Classification Search
CPC .... G02B 7/022; G02B 7/1828; G02B 27/646; G03B 17/04; H04N 5/2257; H04N 5/2253;
(Continued)

(56) References Cited

U.S. PATENT DOCUMENTS

| 2012/0245422 A1* | 9/2012 | Hasbun | G06F 1/1656 600/200 |
| 2014/0043496 A1* | 2/2014 | Azuma | G02B 13/009 348/208.7 |

(Continued)

FOREIGN PATENT DOCUMENTS

| CN | 207586615 U | 7/2018 |
| JP | 6-27525 A | 2/1994 |

(Continued)

OTHER PUBLICATIONS

Office Action dated Apr. 1, 2022 in Chinese Application No. 201980064715.4.
(Continued)

*Primary Examiner* — Xi Wang
(74) *Attorney, Agent, or Firm* — Saliwanchik, Lloyd & Eisenschenk

(57) ABSTRACT

An optical device is provided. An optical device according to one aspect of the present invention comprises: a first main body including a first hole; a second main body including a second hole and connected to the first main body in a foldable manner; a sensor module disposed to be fixed to the first hole; a lens module disposed to be movable in the optical axis direction atop the sensor module; and a transparent member disposed in the second hole, wherein the lens module is disposed in the first hole when the first main body and the second main body are folded, and at least a part of
(Continued)

the lens module is disposed over the first hole when the first main body and the second main body are unfolded.

18 Claims, 7 Drawing Sheets

(58) Field of Classification Search
CPC .... H04N 5/2254; H04N 5/2252; H04N 5/247; H04N 5/23287; H04N 5/225; H05K 5/0226; H05K 5/03; G06F 3/1446
USPC .......................................................... 348/376
See application file for complete search history.

(56) References Cited

U.S. PATENT DOCUMENTS

2017/0353633 A1* 12/2017 Eromäki ................ H04N 5/247
2018/0041668 A1* 2/2018 Cui ........................ H04N 23/54
2020/0326557 A1* 10/2020 Awazu ............... H04N 5/23258

FOREIGN PATENT DOCUMENTS

| JP | 8-201904 A | 8/1996 |
| JP | 2002-202547 A | 7/2002 |
| JP | 2008-129252 A | 6/2008 |
| KR | 10-2005-0029969 A | 3/2005 |
| KR | 10-2010-0010318 A | 2/2010 |
| KR | 10-1013702 B1 | 2/2011 |
| KR | 10-2011-0105069 A | 9/2011 |
| KR | 10-2016-0129724 A | 11/2016 |
| WO | 2017/156462 A1 | 9/2017 |
| WO | 2018/128489 A1 | 7/2018 |

OTHER PUBLICATIONS

International Search Report dated Jan. 10, 2020 in International Application No. PCT/KR2019/012734.
Office Action dated Mar. 20, 2023 in Korean Application No. 10-2018-0117763.
Supplementary European Search Report dated Oct. 21, 2021 in European Application No. 19869575.1.

* cited by examiner

OPTICAL DEVICE

CROSS-REFERENCE TO RELATED APPLICATIONS

This application is the U.S. national stage application of International Patent Application No. PCT/KR2019/012734, filed Sep. 30, 2019, which claims the benefit under 35 U.S.C. § 119 of Korean Application Nos. 10-2018-0117762, filed Oct. 2, 2018; and 10-2018-0117763, filed Oct. 2, 2018; the disclosures of each of which are incorporated herein by reference in their entirety.

TECHNICAL FIELD

The present invention relates to an optical device.

BACKGROUND ART

The following description provides background information for the present embodiment and does not describe the prior art As various portable terminals are widely spread and commonly used, and the wireless Internet services have been commercialized, the demands of consumer related to portable terminals have been diversified and various kinds of additional devices have been installed in portable terminals.

Among them, there is a camera module for photographing a subject as a photograph or a moving picture. Meanwhile, as various types of additional devices are installed in recent camera modules, there is a demand for miniaturization of the camera module.

DETAILED DESCRIPTION OF THE INVENTION

Technical Subject

An object to be solved by the present invention is to provide an optical device capable of implementing a slim external appearance through miniaturization of a camera module.

Technical Solution

An optical device according to one aspect of the present invention comprises: a first main body comprising a first hole; a second main body comprising a second hole and connected to the first main body in a foldable manner; a sensor module disposed to be fixed to the first hole; a lens module disposed to be movable in the optical axis direction atop the sensor module; and a transparent member disposed in the second hole, wherein the lens module is disposed in the first hole when the first main body and the second main body are folded, and at least a part of the lens module is disposed over the first hole when the first main body and the second main body are unfolded.

In addition, it may further comprise an elastic member connected to a lower surface of the lens module and an upper surface of the sensor module.

In addition, when the first main body and the second main body are folded, the elastic member may be compressed, and when the first main body and the second main body are unfolded, the elastic member may be restored.

In addition, when the first main body and the second main body are folded, the lens module is disposed in the first hole by the second main body, and when the first main body and the second main body are unfolded, at least a portion of the lens module may be disposed above the first hole by the elastic member.

In addition, the lens module may comprise: a first upper plate comprising a hole; a first cover member comprising a first lateral plate extending downward from the first upper plate; a bobbin disposed in the first cover member; a lens disposed inside the bobbin; a substrate disposed under the bobbin; a first coil disposed on the bobbin; a first magnet disposed between the first coil and the first lateral plate and facing the first coil; a second coil disposed on the substrate; and a first support member elastically supporting the bobbin at an upper portion and a lower portion of the bobbin.

In addition, it may further comprise a Hall sensor disposed on the sensor module, wherein the Hall sensor may be overlapped with the second coil in the optical axis direction.

In addition, the sensor module may comprise: a second upper plate comprising a hole; a second cover member comprising a second lateral plate extending downward from the second upper plate; a printed circuit board disposed inside the second cover member; an image sensor mounted on the printed circuit board; a base supporting the printed circuit board; a third coil disposed on the base; a second magnet disposed between the third coil and the second lateral plate and facing the third coil; a fourth coil disposed under the second magnet; and a second elastic member elastically supporting the base at an upper portion and a lower portion of the base.

In addition, it may further comprise a Hall sensor for measuring the distortion of the optical axis of the lens module and the optical axis of the sensor module.

In addition, it may further comprise a control unit for outputting a control signal for correcting the distortion of the optical axis measured at the Hall sensor.

In addition, when the first main body and the second main body are folded, the first hole and the second hole may be overlapped in the optical axis direction.

In addition, the first main body and the second main body may be integrally formed.

An optical device according to an aspect of the present invention for achieving the above object comprises: a first main body comprising a first hole; a second main body comprising a second hole and foldable with the first main body; a camera module disposed in the first hole; and a transparent member disposed in the second hole, wherein the camera module may comprise a lens module disposed to be movable in the optical axis direction in the first hole, a reflective member rotatably disposed under the lens module, and a sensor module disposed on one side of the reflective member, and wherein when the first main body and the second main body are folded, the lens module is disposed in the first hole, and when the first main body and the second main body are unfolded, at least a portion of the lens module is disposed above the first hole.

In addition, it may further comprise a first elastic member connected to a lower surface of the lens module and a lower region of the lens module of the camera module.

In addition, when the first main body and the second main body are folded, the first elastic member may be compressed, and when the first main body and the second main body are unfolded, the first elastic member may be restored.

In addition, when the first main body and the second main body are folded, the lens module is disposed in the first hole by the second main body, and when the first main body and the second main body are unfolded, at least a portion of the lens module may be disposed above the first hole by the first elastic member.

In addition, when the first main body and the second main body are folded, the reflective member rotates in one direction by the lens module, and when the first main body and the second main body are unfolded, the reflective member may be rotated in any direction.

In addition, when the first main body and the second main body are folded, the angle formed by the reflective member with the optical axis may be greater than an angle formed by the reflective member with the optical axis when the first main body and the second main body are unfolded.

In addition, the reflective member may reflect light passing through the lens module toward the sensor module.

In addition, the camera module further comprises a guide hole formed on the side of the camera module and guides the rotation of the reflective member, wherein the reflective member comprises a guide protrusion formed on a side surface and inserted into the guide hole, and the guide hole may be formed in an arc shape.

In addition, the camera module may further comprise a second elastic member connected to the reflective member and rotating in a direction to reduce the angle formed by the reflective surface of the reflective member with the optical axis.

In addition, the lens module may comprise: a first upper plate comprising a hole; a first cover member comprising a first lateral plate extending downward from the first upper plate; a bobbin disposed in the first cover member; a lens disposed in the bobbin; a substrate disposed under the bobbin; a first coil disposed on the bobbin; a first magnet disposed between the first coil and the first lateral plate and facing the first coil; a second coil disposed on the substrate; and a first support member elastically supporting the bobbin at an upper portion and a lower portion of the bobbin.

In addition, the sensor module may comprise: a second cover member comprising: a second upper plate comprising a hole; a second lateral plate extending downward from the second upper plate; a printed circuit board disposed in the second cover member; an image sensor mounted on the printed circuit board; a base supporting the printed circuit board; a third coil disposed on the base; a second magnet disposed between the third coil and the second lateral plate and facing the third coil; a fourth coil disposed under the second magnet; and a second elastic member elastically supporting the base at an upper portion and a lower portion of the base.

In addition, when the first main body and the second main body are folded, the first hole and the second hole may be overlapped in an optical axis direction.

In addition, the first main body and the second main body may be integrally formed.

Advantageous Effects

Through this embodiment, an optical device capable of implementing a slim external appearance through miniaturization of a camera module can be provided.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected", "coupled", or "jointed" to another component, the component may be directly connected, coupled, or jointed to the other component, however, it should be understood that another element may be "connected", "coupled" or "jointed" between components.

In addition, when described as being formed or arranged in "on (above)" or "below (under)" of each component, "on (above)" or "below (under)" means that it comprises not only the case where the two components are directly in contact with, but also the case where one or more other components are formed or disposed between the two components. In addition, when expressed as "upper (upper)" or "lower (lower)", the meaning of not only an upward direction but also a downward direction based on one component may be comprised.

The 'optical axis direction' used below is defined as the optical axis direction of the lens. Meanwhile, the 'optical axis direction' may correspond to an 'up-down direction', a 'z-axis direction', and the like.

Hereinafter, the present invention will be described in more detail with reference to the accompanying drawings.

Figure 1:
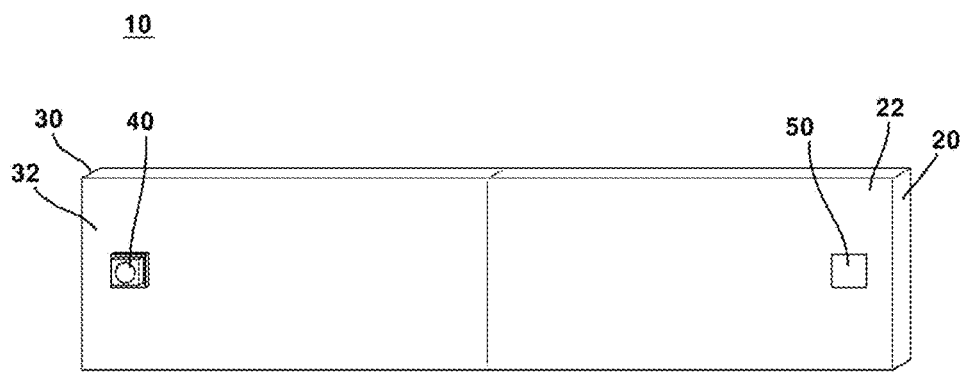
FIG. 1 is a perspective view of an optical device according to an embodiment of the present invention.
Figure 2:
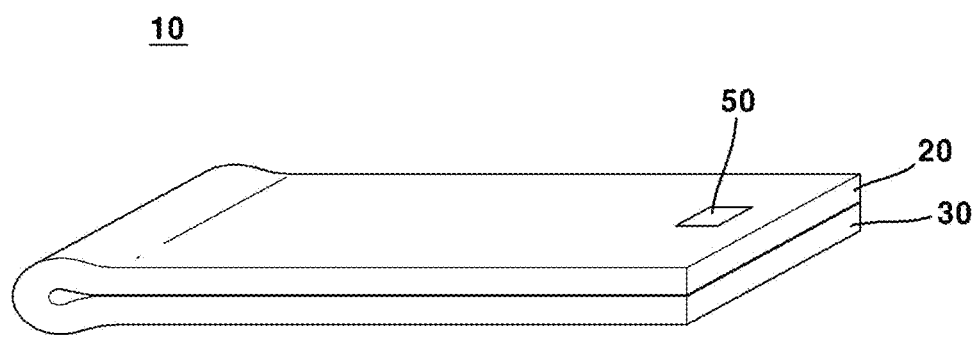
FIG. 2 is a perspective view illustrating a folded state of the optical device of FIG. 1.
Figure 3:
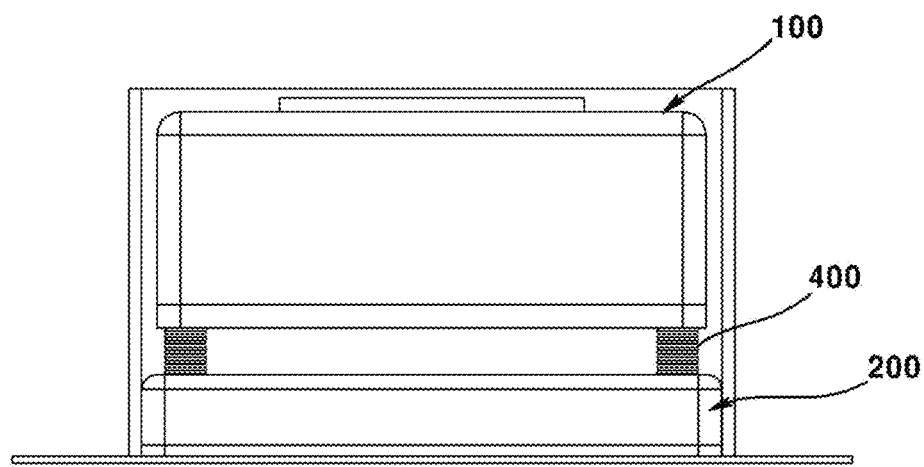
FIG. 3 is a side view of the optical device with some components removed from FIG. 2.
Figure 4:
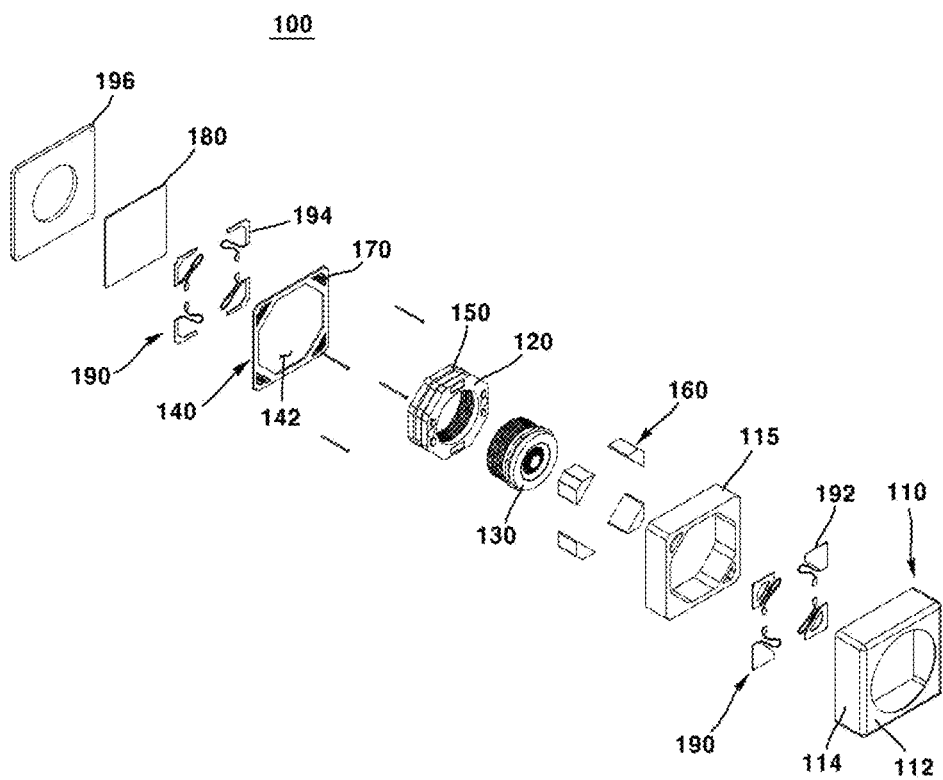
FIG. 4 is an exploded perspective view of a lens module according to an embodiment of the present invention.
Figure 5:
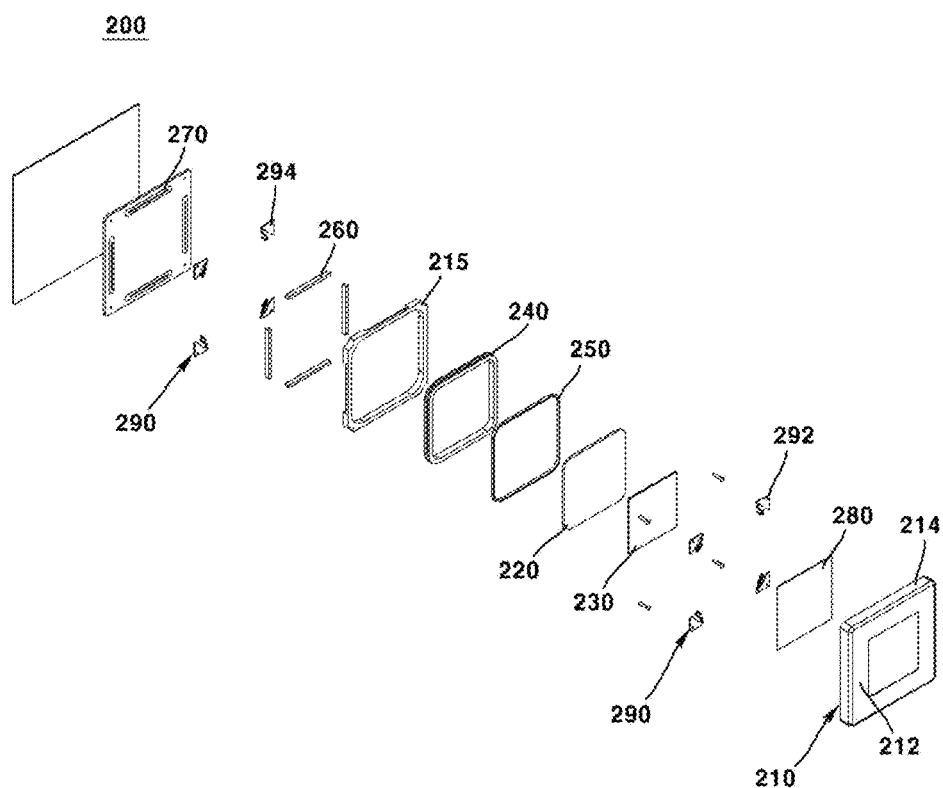
FIG. 5 is an exploded perspective view of a sensor module according to an embodiment of the present invention.
Figure 6:
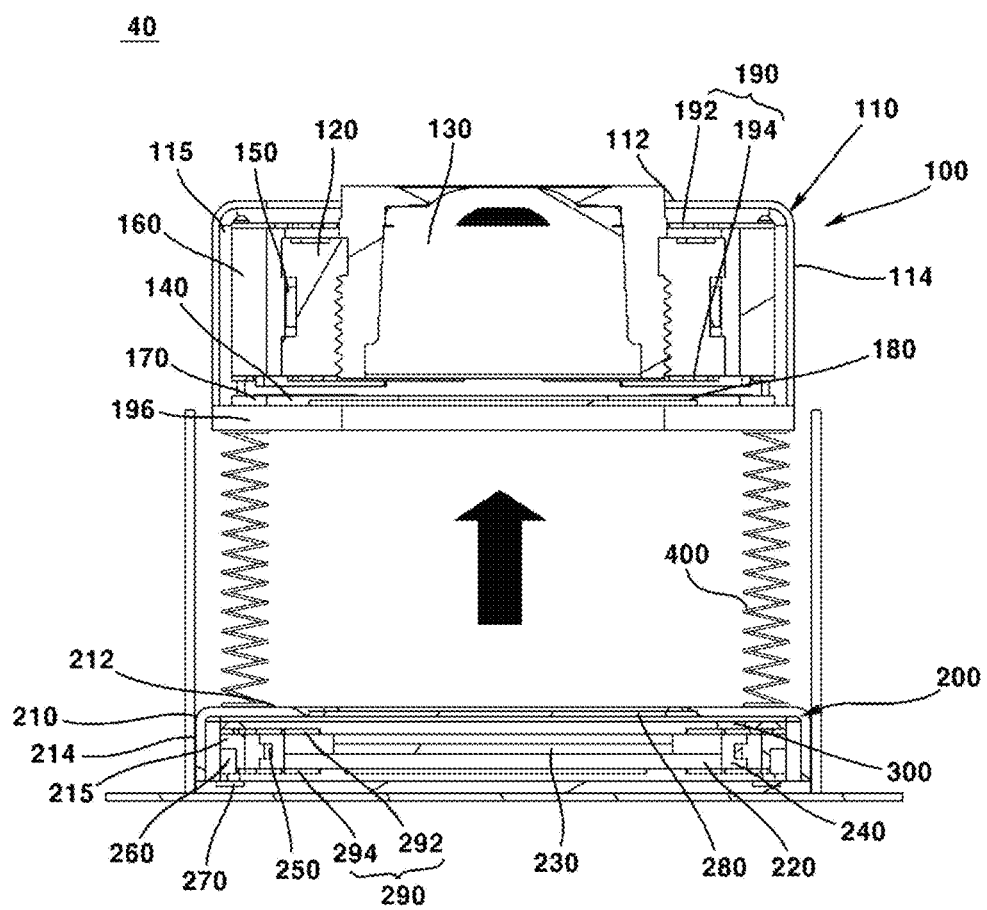
FIGS. 6 and 7 are cross-sectional views of FIG. 3.
Figure 7:
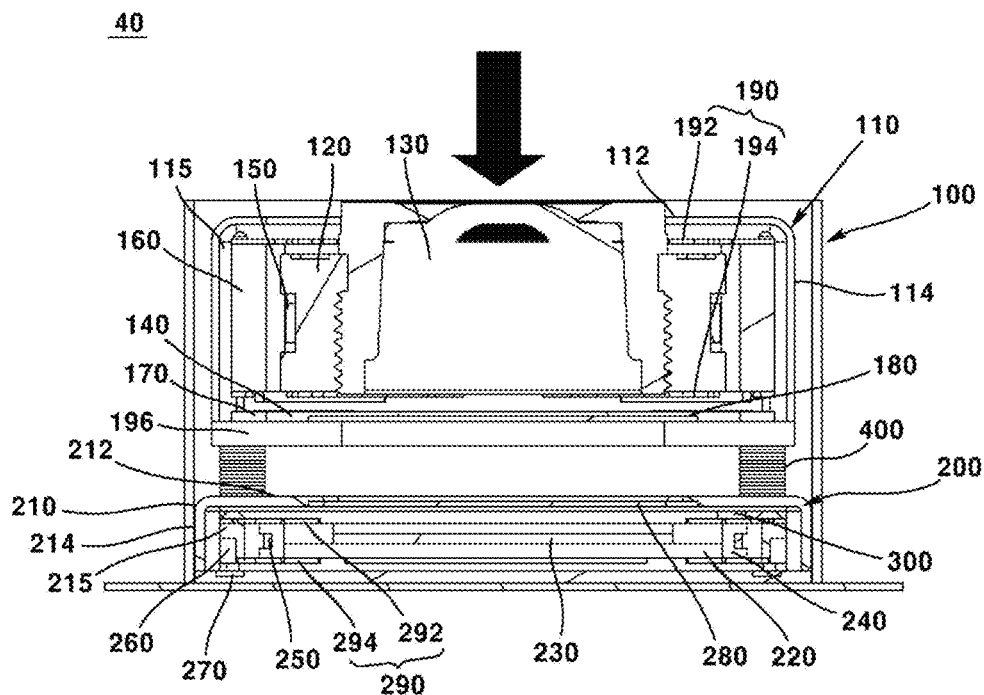
Figure 8:
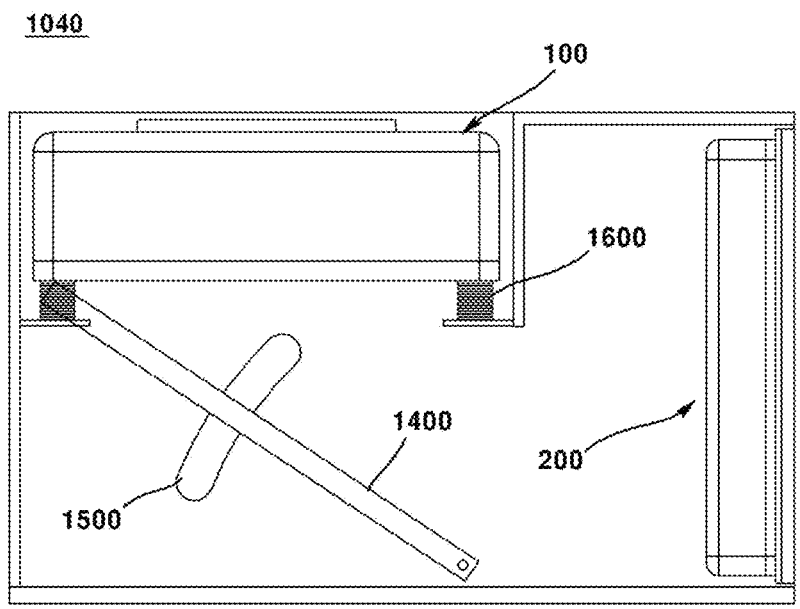
FIG. 8 is a side view of the optical device with some components removed from FIG. 2.
Figure 9:
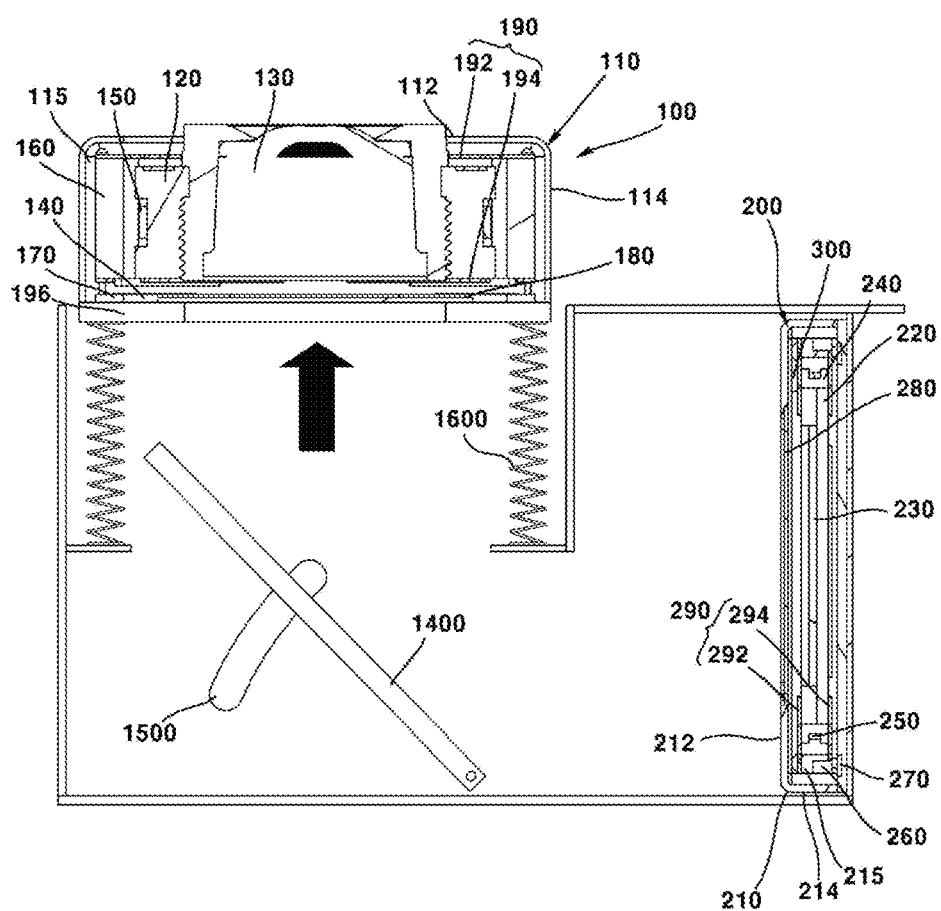
FIGS. 9 and 10 are cross-sectional views of FIG. 8.
Figure 10:
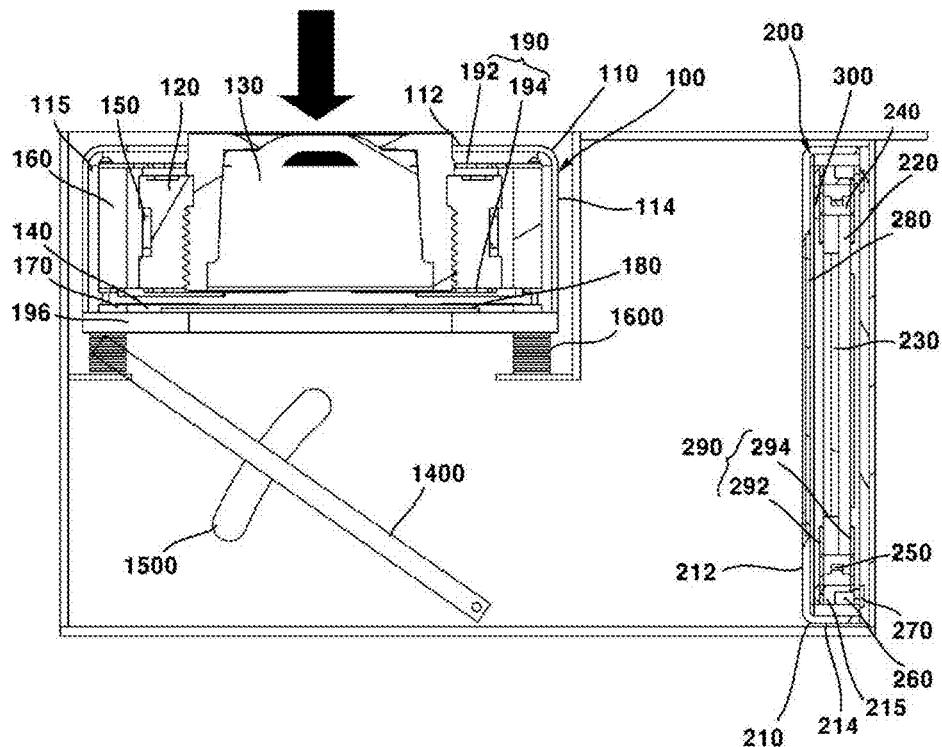

FIG. 1 is a perspective view of an optical device according to an embodiment of the present invention. FIG. 2 is a perspective view illustrating a folded state of the optical device of FIG. 1. FIG. 3 is a side view of the optical device with some components removed from FIG. 2. FIG. 4 is an exploded perspective view of a lens module according to an embodiment of the present invention. FIG. 5 is an exploded perspective view of a sensor module according to an embodiment of the present invention. FIGS. 6 and 7 are cross-sectional views of FIG. 3. FIG. 8 is a side view of the optical device with some components removed from FIG. 2. FIGS. 9 and 10 are cross-sectional views of FIG. 8.

An optical device 10 according to an embodiment of the present invention will be described with reference to FIGS. 1, 2, and 3.

The optical device 10 may be any one of hand phones, portable phones, smart phones, portable smart devices, digital cameras, laptop computers, digital broadcasting terminals, personal digital assistants (PDAs), portable multimedia players (PMPs), and navigation. However, the type of the optical device 10 is not limited thereto, and any device for photographing an image or photograph may be comprised in the optical device 10.

The optical device 10 may comprise main bodies 20 and 30. The main bodies 20 and 30 may form the external appearance of the optical device 10. The main bodies 20 and 30 may be foldable. A display unit may be disposed on one surface of the main bodies 20 and 30. The main bodies 20 and 30 may comprise a first main body 30 and a second main body 20. The first main body 30 and the second main body 20 may be connected in a foldable manner. The configuration in which the first main body 30 and the second main body 20 are foldably connected may comprise a configuration that can be applied by a person skilled in the art. The first main body 30 and the second main body 20 may be integrally formed.

A display unit and cover glasses 22 and 32 may be disposed on one surface of the main bodies 20 and 30. A first display unit and a first cover glass 32 may be disposed on one surface of the first main body 30. A second display unit and a second cover glass 22 may be disposed on one surface of the second main body 20. The first display unit and the second display unit may be integrally formed. The first display unit and the second display unit may be folded. The first cover glass 32 and the second cover glass 22 may be integrally formed. The first cover glass 32 and the second cover glass 22 may be folded. A first display unit may be disposed in the first cover glass 32. A second display unit may be disposed in the second cover glass 22. The display unit may output an image photographed by the camera modules 40 and 1040. When the main bodies 20 and 30 are folded so that the first main body 30 and the second main body 20 face each other, the first cover glass 32 and the second cover glass 22 may face each other.

The main bodies 20 and 30 may accommodate the camera modules 40 and 1040. The camera module 40 may comprise a lens module 100, a sensor module 200, and an elastic member 400. The lens module 100, the sensor module 200, and the elastic member 400 may be disposed on the first main body 30. The lens module 100, the sensor module 200, and the elastic member 400 may be formed penetrating through the first main body 30. The lens module 100 may be disposed on one surface of the first main body 30, and the sensor module 200 may be disposed on the other surface of the first main body 30.

The elastic member 400 may be disposed between the lens module 100 and the sensor module 200. The elastic member 400 may be disposed between the lower surface of the lens module 100 and the upper surface of the sensor module 200.

The first main body 30 may comprise a first hole. The lens module 100, the sensor module 200, and the elastic member 400 may be disposed in a first hole of the first main body 30.

When the first main body 30 and the second main body 20 are folded, the lens module 100 may be disposed in the first hole of the first main body 30 by the second main body 20. When the first main body 30 and the second main body 20 are unfolded, at least a portion of the lens module 100 is disposed above the first hole of the first main body 30 by the elastic member 400, so that a telescope mode can be implemented.

The second main body 20 may comprise a second hole. A transparent member 50 may be disposed in the second hole of the second main body 20. When the first main body 30 and the second main body 20 are folded, the second hole may be overlapped with the first hole in the optical axis direction. When the first main body 30 and the second main body 20 are folded, the transparent member 50 may be overlapped with the camera modules 40 and 1040 in the optical axis direction. When the first main body 30 and the second main body 20 are unfolded, the transparent member 50 may enable the camera modules 40 and 1040 to photograph an image of the subject.

The optical device 10 may comprise camera modules 40 and 1040. The camera modules 40 and 1040 may comprise a lens module 100, a sensor module 200, and an elastic member 400, but additional components other than those are not excluded. The lens module 100, the sensor module 200, and the elastic member 400 may be disposed on the first main body 30. The camera modules 40 and 1040 may photograph an image of a subject.

The camera module 40 according to an embodiment of the present invention will be described with reference to FIGS. 3 to 7.

The camera module 40 may comprise a lens module 100, a sensor module 200, an elastic member 400, a driving unit, a control unit, and a Hall sensor 300, however, it may comprise only some components of them, and does not exclude additional components other than these. The camera module 40 may be disposed on the first main body 30. The camera module 40 may be disposed in the first hole of the first main body 30.

The lens module 100 may be disposed on the main bodies 20 and 30. The lens module 100 may be disposed on the first main body 30. The lens module 100 may be disposed in the first hole of the first main body 30 to be movable in the optical axis direction. When the main bodies 20 and 30 are folded, the lens module 100 may face the transparent member 50. The lens module 100 may be disposed on the sensor module 200. In this case, the lens module 100 may be overlapped with the sensor module 200 in the optical axis direction. A light passing through the lens module 100 may be irradiated to the sensor module 200. Specifically, the light passing through the lens module 100 may be irradiated to an image sensor 230. When the first main body 30 and the second main body 20 are folded, the lens module 100 may be disposed in the first hole of the first main body 30 by the second main body 20. When the first main body 30 and the second main body 20 are unfolded, at least a portion of the lens module 100 may be disposed above the first hole of the first main body 30 by the elastic member 400. Through this, it is possible to implement a telescope mode with one camera module 40 without a separate electronic component.

The sensor module 200 may be disposed on the bodies 20 and 30. The sensor module 200 may be disposed on the first main body 30. The sensor module 200 may be fixedly disposed in the first hole of the first main body 30. The sensor module 200 may be disposed under the lens module 100. In this case, the sensor module 200 may be overlapped with the lens module 100 in the optical axis direction. A light that has passed through the lens module 100 may be irradiated to the sensor module 200.

The driving unit may be disposed on the lens module 100 and/or the sensor module 200. The driving unit may be operated for AF driving and OIS driving of the lens module 100. The driving unit may be operated for AF driving and OIS driving of the sensor module 200. The driving unit may be operated for aligning the optical axis of the lens module 100 and the optical axis of the lens module 200 facing each other. In an embodiment of the present invention, the driving unit is described as an example that operates through electromagnetic interaction between a coil and a magnet, but is not limited thereto and may be variously changed.

The elastic member 400 may be disposed on the camera module 40. The elastic member 400 may move the lens module 100 in the optical axis direction. One end of the elastic member 400 may be connected to the lens module 100 and the other end may be connected to the sensor module 200. One end of the elastic member 400 may be connected to a lower surface of the lens module 100 and the other end may be connected to an upper surface of the sensor module 200. Unlike this, one end of the elastic member 400 may be connected to the lens module 100, and the other end may be connected to other components of the camera module 40 located in the lower portion of the lens module 100. When the first main body 30 and the second main body 20 are folded, the elastic member 400 may be compressed. When the first main body 30 and the second main body 20 are unfolded, the elastic member 400 may be restored. In an embodiment of the present invention, the elastic member 400 is described as an example of a spring, but is not limited thereto and may be variously changed. The elastic member 400 may not be overlapped with a lens 130 of the lens module 100 and the image sensor 230 of the sensor module 200 in the optical axis direction.

The lens module 100 may comprise a first cover member 110. The first cover member 110 may form the external appearance of the lens module 100. The first cover member 110 may have a hexahedral shape with an open lower portion, but is not limited thereto and may be variously changed. The first cover member 110 may be a non-magnetic material. If the first cover member 110 is provided with a magnetic material, the magnetic force of a first magnet 160 may be affected. The first cover member 110 may be formed of a metal material. In more detail, the first cover member 110 may be formed of a metal plate. In this case, the first cover member 110 may block electromagnetic interference (EMI). Because of this characteristic of the first cover member 110, the first cover member 110 may be referred to as an 'EMI shield can'. The first cover member 110 may be connected to the ground portion of the substrate 140. Through this, the first cover member 110 may be grounded. The first cover member 110 may block radio waves generated from the outside of the lens module 100 from flowing into the inner side of the first cover member 110. In addition, the first cover member 110 may block radio waves generated inside the first cover member 110 from being radiated to the outside of the first cover member 110. However, the material of the first cover member 110 is not limited thereto and may be variously changed.

The first cover member 110 may comprise a first upper plate 112 and a first lateral plate 114. The first cover member 110 may comprise a first upper plate 112 and a first lateral plate 114 extending from an outer side to a lower side of the first top plate 112. The lower end of the first lateral plate 114 of the first cover member 110 may be connected to a lens cover glass 196. In the inner space formed by the first cover member 110 and the lens cover glass 196, a bobbin 120, a lens 130, a substrate 140, a first coil 150, a first magnet 160, a second coil 170, a first filter 180, and a first support member 190 may be disposed. The first cover member 110 may protect internal components from external impacts and inhibit penetration of external contaminants. However, the present invention is not limited thereto, and the lower end of the first lateral plate 114 of the first cover member 110 may be directly coupled to other components.

The first cover member 110 may comprise an opening (hole) formed in the first upper plate 112. The opening of the first cover member 110 may expose the lens 130 to the outside. The opening of the first cover member 110 may be formed in a shape corresponding to the lens 130.

The lens module 100 may comprise a bobbin 120. The bobbin 120 may be located inside the first cover member 110. A lens 130 may be coupled to the bobbin 120. In more detail, the outer circumferential surface of the lens 130 may be coupled to the inner circumferential surface of the bobbin 120. The first coil 150 may be wound around the bobbin 120. A first support member 190 may be disposed on the bobbin 120. The lower portion of the bobbin 120 may be coupled to a first lower support member 194, and the upper portion of the bobbin 120 may be coupled to the first upper support member 192. The bobbin 120 may move in the optical axis direction with respect to the first cover member 110. The bobbin 120 may move in a direction perpendicular to the optical axis direction with respect to the first cover member 110. The bobbin 120 may move in a direction perpendicular to the optical axis direction and the optical axis direction with respect to the first cover member 110. The bobbin 120 may be moved by an electromagnetic interaction between the first coil 150 and the first magnet 160 and/or an electromagnetic interaction between the first magnet 160 and the second coil 170.

The lens module 100 may comprise a lens 130. The lens 130 may be coupled to the bobbin 120. The lens 130 may be disposed inside the bobbin 120. The lens 130 may comprise at least one lens. The lens 130 may be combined with the bobbin 120 to move integrally with the bobbin 120. The lens 130 may be coupled to the bobbin 120 by an adhesive (not shown). For example, the lens 130 may be screw-coupled with the bobbin 120. Meanwhile, a light passing through the lens 130 may be irradiated to the image sensor 230 mounted on the printed circuit board 220.

The driving unit may comprise a first coil 150. The first coil 150 may be disposed on the bobbin 120. The first coil 150 may be wound on an outer circumferential surface of the bobbin 120. The first coil 150 may be disposed in a groove formed on an outer circumferential surface of the bobbin 120. The first coil 150 may face the first magnet 160. The first coil 150 may electromagnetically interact with the first magnet 160. In this case, when a current is supplied to the first coil 150 and a magnetic field is formed around the first coil 150, the first coil 150 can be moved with respect to the first magnet 160 by an electromagnetic interaction between the first coil 150 and the first magnet 160. The first coil 150 may move for AF driving.

The lens module 100 may comprise a housing 115. The housing 115 may be disposed inside the first cover member 110. The housing 115 may be disposed outside the bobbin 120. An opening may be formed in the housing 115. The bobbin 120 may be disposed in the opening of the housing 115. The first support member 190 may be coupled to the housing 115. A first upper support member 192 may be coupled to an upper surface of the housing 115, and a first lower support member 194 may be coupled to a lower surface of the housing 115. The first magnet 160 may be coupled to the inner side surface of the housing 115.

The driving unit may comprise a first magnet 160. The first magnet 160 may be disposed between the first coil 150 and the bobbin 120 and the first cover member 110. The first magnet 160 may be coupled to a component such as a housing 115 disposed between the bobbin 120 and the first cover member 110. The first magnet 160 may face the first coil 150. The first magnet 160 may face the first coil 150 in a direction perpendicular to the optical axis. The first magnet 160 may electromagnetically interact with the first coil 150. The first magnet 160 may move the bobbin 120 on which the first coil 150 is wound. The first magnet 160 may move the first coil 150 for AF driving. The first magnet 160 may face the second coil 170. The first magnet 160 may face the second coil 170 in the optical axis direction. The first magnet 160 may electromagnetically interact with the second coil 170. The first magnet 160 may move the second coil 170. The first magnet 160 may move the second coil 170 for OIS driving. The first magnet 160 may comprise a plurality of first magnets. Each of the plurality of first magnets may be disposed to be spaced apart from each other. In an embodiment of the present invention, although the four first magnets are described as being disposed at each inner side corner of the housing 115 as an example, the number and arrangement of the first magnets 160 are not limited thereto and may be variously changed.

The lens module 100 may include a substrate 140. The substrate 140 may be disposed under the bobbin 120. The substrate 140 may be disposed inside the first cover member 110. The second coil 170 may be disposed on the substrate 140. The substrate 140 may be coupled to the bobbin 120. The substrate 140 may include a substrate hole 142. The bobbin 120 may be coupled to the substrate hole 142. The substrate 140 may be electrically connected to the first coil 150 and the second coil 170. The second coil 170 may be mounted on the substrate 140 in a pattern shape.

The driving unit may comprise a second coil 170. The second coil 170 may be disposed on the substrate 140. The second coil 170 may be mounted on the substrate 140 in a pattern shape. The second coil 170 may face the first magnet 160. The second coil 170 may be overlapped with the first magnet 160 in the optical axis direction. The second coil 170 may electromagnetically interact with the first magnet 160. When current is supplied to the second coil 170, the second coil 170 may electromagnetically interact with the first magnet 160. The second coil 170 may perform OIS driving by electromagnetic interaction of the first magnet 160. The second coil 170 may be overlapped with the Hall sensor 300 in the optical axis direction. When current is supplied to the second coil 170, a change in the electric or magnetic field generated by the second coil 170 may be detected by the Hall sensor 300. The second coil 170 may comprise a plurality of second coils. Each of the plurality of second coils may be disposed to be spaced apart from each other. In an embodiment of the present invention, although it is described as an example that four second coils are disposed at each corner of the upper surface of the substrate 140, it is not limited thereto, and the number and arrangement of the second coils 170 may be variously changed.

The lens module 100 may comprise a first filter 180. The first filter 180 may be an infrared filter. The first filter 180 may block light in the infrared region from entering into the sensor module 200. The first filter 180 may be disposed between the lens 130 and the lens cover glass 196. The first filter 180 may be formed of a film material or a glass material. The first filter 180 may be formed by coating an infrared blocking coating material on a flat optical filter such as a cover glass or cover glass for protecting an imaging surface. As an example, the first filter 180 may be an infrared absorption filter (Blue filter) absorbing infrared rays. As another example, the first filter 180 may be an IR cut filter that reflects infrared rays.

The lens module 100 may comprise a first support member 190. The first support member 190 may elastically support the bobbin 120 for AF driving and/or OIS driving. The first support member 190 may comprise a first upper support member 192 and a first lower support member 194. The first upper support member 192 may be coupled to an upper portion of the bobbin 120 and an upper portion of the housing 115. The first lower support member 194 may be coupled to a lower portion of the bobbin 120 and a lower portion of the housing 115. The first upper support member 192 and the first lower support member 194 may be connected through a first connection support member.

The lens module 100 may comprise a lens cover glass 196. The lens cover glass 196 may be coupled to the lower end of the lateral plate 114 of the first cover member 110. The lens cover glass 196 may comprise a hole. The light passing through the lens 130 may pass through the hole of the lens cover glass 196 and be irradiated to the sensor module 200. The lens cover glass 196 may be disposed at a position facing the first cover glass 32. The lens cover glass 196 may be coupled to the first cover glass 32, or may not be coupled and may be spaced apart from the first cover glass 32 by a predetermined distance. The lens cover glass 196 may be formed of the same material as the first cover glass 32.

The sensor module 200 may comprise a second cover member 210. The second cover member 210 may form the external appearance of the sensor module 200. The second cover member 210 may have a hexahedral shape with an open lower portion, but is not limited thereto and may be variously changed. The second cover member 210 may be a non-magnetic material. If the second cover member 210 is provided with a magnetic material, the magnetic force of the second magnet 260 may be affected. The second cover member 210 may be formed of a metal material. In more detail, the second cover member 210 may be formed of a metal plate. In this case, the second cover member 210 may block electromagnetic interference (EMI). Due to this characteristic of the second cover member 210, the second cover member 210 may be referred to as an 'EMI shield can'. The second cover member 210 may be connected to the ground portion of the printed circuit board 220. Through this, the second cover member 210 may be grounded. The second cover member 210 may block radio waves generated from the outside of the sensor module 200 from flowing into the second cover member 210. In addition, the second cover member 210 may block radio waves generated inside the second cover member 210 from being radiated to the outside of the second cover member 210. However, the material of the second cover member 210 is not limited thereto and may be variously changed.

The second cover member 210 may comprise a second upper plate 212 and a second lateral plate 214. The second cover member 210 may comprise a second upper plate 212 and a second lateral plate 214 extending downward from the outside of the second upper plate 212. The inner space formed by the second cover member 210 may be disposed with a coupling member 215, a printed circuit board 220, an image sensor 230, a base 240, a third coil 250, a second magnet 260, a fourth coil 270, a second filter 280, and a second support member 290. The second cover member 210 may protect internal components from external impacts and at the same time, inhibit penetration of external contaminants.

The second cover member 210 may comprise an opening (hole) formed in the second upper plate 212. The opening of the second cover member 210 allows light that has passed through the lens module 100 to be irradiated to the image sensor 230.

The sensor module 200 may comprise a printed circuit board 220. The printed circuit board 220 may be disposed inside the second cover member 210. The printed circuit board 220 may be electrically connected to the third coil 250 and the fourth coil 270, the Hall sensor 300, and the control unit. The printed circuit board 220 may supply power (current) to the third coil 250 and the fourth coil 270, the Hall sensor 300, and the control unit. The control unit may be disposed on the printed circuit board 220. An image sensor 230 may be disposed on the printed circuit board 220. The printed circuit board 220 may be electrically connected to the image sensor 230. A light passing through the lens module 100 may be irradiated to the image sensor 230 mounted on the printed circuit board 200.

The sensor module 200 may comprise an image sensor 230. The image sensor 230 may be disposed on the printed circuit board 220. The image sensor 230 may be electrically connected to the printed circuit board 220. For example, the image sensor 230 may be coupled to the printed circuit board 220 by a surface mounting technology (SMT). As another example, the image sensor 230 may be coupled to the printed circuit board 220 by flip chip technology. The image sensor 230 may be aligned so that its optical axis and the optical axis of the lens module 100 coincide. That is, the optical axis of the image sensor 230 and the optical axis of the lens module 100 may be aligned. Through this, the image sensor 230 may acquire a light that has passed through the lens module 100. The image sensor 230 may convert the light irradiated to the effective image area of the image sensor 230 into an electrical signal. The image sensor 230 may be any one of a charge coupled device (CCD), a metal oxide semi-conductor (MOS), a CPD, and a CID. However, the type of the image sensor 230 is not limited thereto, and the image sensor 230 may comprise any configuration capable of converting incident light into an electrical signal.

The sensor module 200 may comprise a base 240. A third coil 250 may be disposed on an outer circumferential surface of the base 240. The third coil 250 may be wound on an outer circumferential surface of the base 240. The base 240 may comprise a coupling groove on an outer circumferential surface. The third coil 250 may be disposed in the coupling groove of the base 240. The base 240 may comprise a coupling hole. The printed circuit board 220 may be coupled to the coupling hole of the base 240. The coupling hole of the base 240 may be formed in a shape corresponding to the printed circuit board 220. The second support member 290 may be coupled to the base 240. A second upper support member 292 may be coupled to an upper surface of the base 240, and a second lower support member 294 may be coupled to a lower surface of the base 240. The base 240 may be moved in the optical axis direction with respect to the second cover member 210. The base 240 may be moved in a direction perpendicular to the optical axis direction with respect to the second cover member 210. The base 240 may be moved in a direction perpendicular to the optical axis direction and the optical axis direction with respect to the second cover member 210. The base 240 may be moved by an electromagnetic interaction between the third coil 250 and the second magnet 260 and/or an electromagnetic interaction between the second magnet 260 and the fourth coil 270.

In one embodiment of the present invention, the base 240 is described as an example formed in a rectangular ring shape, but the shape of the base 240 is not limited thereto and may be variously changed.

The driving unit may comprise a third coil 250. The third coil 250 may be disposed on the base 240. The third coil 250 may be wound on an outer circumferential surface of the base 240. The third coil 250 may be disposed in a coupling groove formed on an outer circumferential surface of the base 240. The third coil 250 may face the second magnet 260. The third coil 250 may electromagnetically interact with the second magnet 260. In this case, when current is supplied to the third coil 250 and a magnetic field is formed around the third coil 250, the third coil 250 may move with respect to the second magnet 260 by the electromagnetic interaction between the third coil 250 and the second magnet 260. The third coil 250 may move for AF driving.

The sensor module 200 may comprise a coupling member 215. The coupling member 215 may be disposed outside the base 240. The coupling member 215 may comprise a through hole. The base 240 may be disposed in the through hole of the coupling member 215. A second magnet 260 may be disposed on the coupling member 215. The coupling member 215 may comprise a coupling groove formed on an outer circumferential surface. The second magnet 260 may be coupled to the coupling groove of the coupling member 215. The second support member 290 may be coupled to the coupling member 215. A second upper support member 292 may be coupled to an upper portion of the coupling member 215, and a second lower support member 294 may be coupled to a lower portion of the coupling member 215. In one embodiment of the present invention, the coupling member 215 is described as an example formed in a rectangular ring shape, but the shape of the coupling member 215 is not limited thereto and may be variously changed.

The driving unit may comprise a second magnet 260. The second magnet 260 may be disposed between the third coil 250 and the base 240 and the second cover member 210. The second magnet 260 may be coupled to a component such as a coupling member 215 disposed between the base 240 and the second cover member 210. The second magnet 260 may face the third coil 250. The second magnet 260 may face the third coil 250 in a direction perpendicular to the optical axis. The second magnet 260 may electromagnetically interact with the third coil 250. The second magnet 260 may move the base 240 on which the third coil 250 is wound. The second magnet 260 may move the third coil 250 for AF driving. The second magnet 260 may face the fourth coil 270. The second magnet 260 may face the fourth coil 270 in the optical axis direction. The second magnet 260 may electromagnetically interact with the fourth coil 270. The second magnet 260 may move the fourth coil 270. The second magnet 260 may move the fourth coil 270 for OIS driving. The second magnet 260 may comprise a plurality of second magnets. Each of the plurality of second magnets may be disposed to be spaced apart from each other. In an embodiment of the present invention, the four second magnets are described as being disposed on each side of the coupling member 215 as an example, but the number and arrangement of the second magnets 260 are not limited thereto.

The driving unit may comprise a fourth coil 270. The fourth coil 270 may be mounted in a pattern shape on a coil substrate connected to the printed circuit board 220. The fourth coil 270 may face the second magnet 260. The fourth coil 270 may be overlapped with the second magnet 260 in the optical axis direction. The fourth coil 270 may electromagnetically interact with the second magnet 260. When current is supplied to the fourth coil 270, the fourth coil 270 may electromagnetically interact with the second magnet 260. The fourth coil 270 may perform OIS driving through electromagnetic interaction with the second magnet 260. The fourth coil 270 may comprise a plurality of fourth coils. Each of the plurality of fourth coils may be disposed to be spaced apart from each other. In the embodiment of the present invention, the four fourth coils are described as being disposed on the upper surface of the coil substrate, but the number and arrangement of the fourth coils 270 are not limited thereto and may be variously changed. In addition, the fourth coil 270 may be coupled to another component in a configuration other than a pattern coil for OIS driving of the printed circuit board 220 and the image sensor 230 mounted on the printed circuit board 220.

The sensor module 200 may comprise a second filter 280. The second filter 280 may be an infrared filter. The second filter 280 may block the light in the infrared region incident to the image sensor 230. The second filter 280 may be disposed between the image sensor 230 and the second cover member 210. The second filter 280 may be formed of a film material or a glass material. The second filter 280 may be formed by coating an infrared blocking coating material on a flat optical filter such as a cover glass or cover glass for protecting an imaging surface. As an example, the second filter 280 may be an infrared absorption filter (Blue filter) that absorbs infrared rays. As another example, the second filter 280 may be an IR cut filter that reflects infrared rays.

The sensor module 200 may comprise a second support member 290. The second support member 290 may elastically support the base 240 for AF driving and/or OIS driving. The second support member 290 may comprise a second upper support member 292 and a second lower support member 294. The second upper support member 292 may be coupled to an upper portion of the base 240 and an upper portion of the coupling member 215. The second lower support member 294 may be coupled to a lower portion of the base 240 and a lower portion of the coupling member 215. The second upper support member 292 and the second lower support member 294 may be connected through a second connection support member.

A hall sensor 300 may be disposed on the sensor module 200. The Hall sensor 300 may be disposed on the second upper plate 212 of the second cover member 210. In an embodiment of the present invention, the Hall sensor 300 is illustrated to be disposed on a lower surface of the second upper plate 212 of the second cover member 210, however, in order to measure the magnetic flux change of the second coil 170, the Hall sensor 300 is preferably disposed on an upper surface of the second upper plate 212 of the second cover member 210. The Hall sensor 300 may be overlapped with the second coil 170 in the optical axis direction. The Hall sensor 300 may detect a change in an electric field or a magnetic field generated by the second coil 170. The Hall sensor 300 may measure a degree of distortion between the optical axis of the lens module 100 and the optical axis of the sensor module 200 through a change in the electric or magnetic field generated by the second coil 170. In this case, the Hall sensor 300 may measure the degree of distortion of the optical axis of the lens module 100 and the optical axis of the sensor module 200 in the optical axis direction and/or in a direction perpendicular to the optical axis direction.

The optical device 10 may comprise a control unit. The control unit may be disposed on the printed circuit board 220. The control unit may output a signal supplying current to the first to fourth coils 150, 170, 250, and 270. The control unit may receive information on a degree to which the optical axis of the lens module 100 detected by the Hall sensor 300 and the optical axis of the sensor module 200 are misaligned. The control unit supplies currents to the first to fourth coils 150, 170, 250, and 270 based on the degree of misalignment between the optical axis of the lens module 100 and the optical axis of the sensor module 200, and may output a signal for aligning (correcting) the optical axis of the lens module 100 and the optical axis of the sensor module 200. In addition, when the camera is turned on, or, when the main bodies 20 and 30 are folded so that the sensor module 100 and the lens module 200 face each other, the control unit may output a signal for aligning (correcting) the optical axis of the lens module 100 and the optical axis of the sensor module 200.

An optical device 10 according to another embodiment of the present invention will be described with reference to FIGS. 1, 2, and 8. The detailed configuration of the optical device 10 according to another embodiment of the present invention, which is not described below, may be understood to be the same as the detailed configuration of the optical device 10 according to an embodiment of the present invention.

The main bodies 20 and 30 may accommodate the camera module 1040. The camera module 1040 may comprise: a lens module 100; a sensor module 200; a reflective member 1400; a guide hole 1500; a first elastic member 1600; and a second elastic member (not shown). In the first main body 30, the lens module 100, the sensor module 200, the reflective member 1400, the guide hole 1500, the first elastic member 1600, and the second elastic member (not shown) may be disposed.

The first elastic member 1600 may be disposed under the lens module 100. One side of the first elastic member 1600 may be connected to a lower surface of the lens module 100, and the other side may be connected to a region below the lens module 100 of the camera module 1040. The other side of the first elastic member 1600 may be connected to an upper surface of the support portion being extended from the inner surface of the camera module 1040.

The first main body 30 may comprise a first hole. The camera module 1040 may be disposed in the first hole of the first main body 30. A lens module 100, a reflective member 1400, a guide hole 1500, and a first elastic member 1600 may be disposed in the first hole of the first main body 30. When the first main body 30 and the second main body 20 are folded, the lens module 100 may be disposed in the first hole of the first main body 30 by the second main body 20. When the first main body 30 and the second main body 20 are unfolded, at least a portion of the lens module 100 is disposed above the first hole of the first main body 30 by the first elastic member 1600, so that a telescope mode can be implemented.

The second main body 20 may comprise a second hole. A transparent member 50 may be disposed in the second hole of the second main body 20. When the first main body 30 and the second main body 20 are folded, the second hole may be overlapped with the first hole in the optical axis direction. When the first main body 30 and the second main body 20 are folded, the transparent member 50 may be overlapped with the camera module 1040 in the optical axis direction. When the first main body 30 and the second main body 20 are unfolded, the transparent member 50 may enable the camera module 1040 to photograph an image of the subject.

The optical device 10 may comprise a camera module 1040. The camera module 1040 may comprise a lens module 100, a sensor module 200, a Hall sensor 300, a reflective member 1400, a guide hole 1500, a first elastic member 1600, and a second elastic member, but does not exclude other additional components. The lens module 100, the sensor module 200, the Hall sensor 300, the reflective member 1400, the guide hole 1500, the first elastic member 1600, and the second elastic member may be disposed on the first main body 30. The camera module 1040 may photograph an image of a subject.

A camera module 1040 according to another embodiment of the present invention will be described with reference to FIGS. 4, 5 and 8 to 10.

The camera module 1040 may be disposed on the first main body 30. The camera module 1040 may be disposed in the first hole of the first main body 30. When the first main body 30 and the second main body 20 are folded, the camera module 1040 may be overlapped with the second hole in the optical axis direction.

The lens module 100 may be disposed on the main bodies 20 and 30. The lens module 100 may be disposed on the first main body 30. The lens module 100 may be disposed in the first hole of the first main body 30 to be movable in the optical axis direction. When the main bodies 20 and 30 are folded, the lens module 100 may face the transparent member 50. The lens module 100 may be disposed on a reflective member 1400. In this case, the lens module 100 may be overlapped with the sensor module 200 in a direction perpendicular to the optical axis.

A light that has passed through the lens module 100 may be irradiated to the image sensor of the sensor module 200 by the reflective member 1400. When the first main body 30 and the second main body 20 are folded, the lens module 100 may be disposed in the first hole of the first main body 30 by the second main body 20. When the first main body 30 and the second main body 20 are unfolded, at least a portion of the lens module 100 may be disposed above the first hole of the first main body 30 by a first elastic member 1600. Through this, it is possible to implement a telescope mode with one camera module 1040 without a separate electronic component.

The sensor module 200 may be disposed on the main bodies 20 and 30. The sensor module 200 may be disposed on the first main body 30. The sensor module 200 may be fixedly disposed on the first main body 30. The sensor module 200 may be disposed in a direction perpendicular to the lens module 100 and the optical axis. The sensor module 200 may be disposed in a direction perpendicular to the reflective member 1400 and the optical axis. The sensor module 200 may be disposed on one side of the reflective member. In another embodiment of the present invention, the sensor module 200 is described as an example that is overlapped with both the lens module 100 and the reflective member 1400 in a direction perpendicular to the optical axis. The sensor module 200 may be formed in a size not being overlapped with the lens module 100 in a direction perpendicular to the optical axis. A light that has passed through the lens module 100 and reflected from the reflective member 1400 may be irradiated to the sensor module 200.

The driving unit may be disposed on the lens module 100 and/or the sensor module 200. The driving unit may be operated for AF and OIS driving of the lens module 100. The driving unit may be operated for AF driving and OIS driving of the sensor module 200. The driving unit may be operated for aligning the optical axis of the lens module 100 and the optical axis of the sensor module 200. In another embodiment of the present invention, the driving unit is described as being operated through an electromagnetic interaction between a coil and a magnet, but is not limited thereto and may be variously changed.

The reflective member 1400 may be disposed on the camera module 1040. The reflective member 1400 may be disposed on the first main body 30. The reflective member 1400 may be disposed under the lens module 100. The reflective member 1400 may be disposed on one side of the sensor module 200. The reflective member 1400 may comprise a prism or the like. The reflective member 1400 may be rotatably disposed. The reflective member 1400 may comprise a guide protrusion (not shown). The guide protrusion (not shown) of the reflective member 1400 may be inserted into the guide hole 1500 to adjust the rotation path of the reflective member 1400. When the first main body 30 and the second main body 20 are folded, the reflective member 1400 may be rotated in one direction by the lens module 100. When the first main body 30 and the second main body 20 are unfolded, the reflective member 1400 may be rotated in other direction by the second elastic member (not shown). When the first main body 30 and the second main body 20 are folded, the angle formed by the reflective member 1400 with the optical axis when the first main body 30 and the second main body 20 are folded, may be greater than the angle formed by the reflective member 1400 with the optical axis when the first main body 30 and the second main body 20 are unfolded. Through this, the reflective member 1400 may adjust the focus of the light irradiated to the image sensor 200.

A guide hole 1500 may be disposed in the camera module 1040. The guide hole 1500 may be formed on the side surface of the camera module 1040. The guide hole 1500 may be formed in an arc shape. The width of the guide hole 1500 may be formed to correspond to the size of the guide protrusion of the reflective member 1400.

A first elastic member 1600 may be disposed on the camera module 1040. The first elastic member 1600 may move the lens module 100 in the optical axis direction. One end of the first elastic member 1600 may be connected to the lens module 100 and the other end may be disposed below the lens module 100. The other end of the first elastic member 1600 may be disposed on an upper surface of the support portion extending from the side surface of the camera module 1040. When the first main body 30 and the second main body 20 are folded, the first elastic member 1600 may be compressed. When the first main body 30 and the second main body 20 are unfolded, the first elastic member 1600 may be restored. In another embodiment of the present invention, the first elastic member 1600 is described as an example of a spring, but is not limited thereto and may be variously changed. The first elastic member 1600 may not being overlapped with the lens 130 of the lens module 100 in the optical axis direction.

The second elastic member may be disposed on the camera module 1040. The second elastic member may be connected to the reflective member 1400. The second elastic member may apply an elastic force to rotate the reflective surface of the reflective member 1400 in a direction that decreases an angle formed with the optical axis. When the first main body 30 and the second main body 20 are unfolded, the second elastic member may rotate the reflective surface of the reflective member 1400 so that the angle formed with the optical axis becomes small.

The lens module 100 may comprise a first cover member 110. The first cover member 110 may form the external appearance of the lens module 100. The first cover member 110 may have a hexahedral shape with an open lower portion, but is not limited thereto and may be variously changed. The first cover member 110 may be a non-magnetic material. If the first cover member 110 is provided with a magnetic material, the magnetic force of the first magnet 160 may be affected. The first cover member 110 may be formed of a metal material. In more detail, the first cover member 110 may be formed of a metal plate. In this case, the first cover member 110 may block electromagnetic interference (EMI). Because of this characteristic of the first cover member 110, the first cover member 110 may be referred to as an 'EMI shield can'. The first cover member 110 may be connected to the ground portion of the substrate 140. Through this, the first cover member 110 may be grounded. The first cover member 110 may block radio waves generated from the outside of the lens module 100 from flowing into the first cover member 110. In addition, the first cover member 110 may block radio waves generated inside the first cover member 110 from being radiated to the outside of the first cover member 110. However, the material of the first cover member 110 is not limited thereto and may be variously changed.

The first cover member 110 may comprise a first upper plate 112 and a first lateral plate 114. The first cover member 110 may comprise a first upper plate 112 and a first lateral plate 114 being extended from an outer side to a lower side of the first upper plate 112. The lower end of the first lateral plate 114 of the first cover member 110 may be connected to the lens cover glass 196. In the inner space formed by the first cover member 110 and a lens cover glass 196, a bobbin 120, a lens 130, a substrate 140, a first coil 150, a first magnet 160, a second coil 170, a first filter 180, and a first support member 190 may be disposed. The first cover member 110 may protect internal components from external impacts and inhibit penetration of external contaminants. However, the present invention is not limited thereto, and the lower end of the first lateral plate 114 of the first cover member 110 may be directly coupled to other components.

The first cover member 110 may comprise an opening (hole) formed in the first upper plate 112. The opening of the first cover member 110 may expose the lens 130 to the outside. The opening of the first cover member 110 may be formed in a shape corresponding to the lens 130.

The lens module 100 may comprise a bobbin 120. The bobbin 120 may be located inside the first cover member 110. The lens 130 may be coupled to the bobbin 120. In more detail, the outer circumferential surface of the lens 130 may be coupled to an inner circumferential surface of the bobbin 120. The first coil 150 may be wound around the bobbin 120. A first support member 190 may be disposed on the bobbin 120. The lower portion of the bobbin 120 may be coupled to the first lower support member 194, and the upper portion of the bobbin 120 may be coupled to the first upper support member 192. The bobbin 120 may move in the optical axis direction with respect to the first cover member 110. The bobbin 120 may move in a direction perpendicular to the optical axis direction with respect to the first cover member 110. The bobbin 120 may move in a direction perpendicular to the optical axis direction and the optical axis direction with respect to the first cover member 110. The bobbin 120 may be moved by an electromagnetic interaction between the first coil 150 and the first magnet 160 and/or an electromagnetic interaction between the first magnet 160 and the second coil 170.

The lens module 100 may comprise a lens 130. The lens 130 may be coupled to the bobbin 120. The lens 130 may be disposed inside the bobbin 120. The lens 130 may comprise at least one lens. The lens 130 may be coupled with the bobbin 120 to move integrally with the bobbin 120. The lens 130 may be coupled to the bobbin 120 by an adhesive (not shown). For example, the lens 130 may be screw-coupled to the bobbin 120. Meanwhile, a light passing through the lens 130 may be irradiated to the image sensor 230 mounted on the printed circuit board 220 through the reflective member 1400.

The driving unit may comprise a first coil 150. The first coil 150 may be disposed on the bobbin 120. The first coil 150 may be wound on an outer circumferential surface of the bobbin 120. The first coil 150 may be disposed in a groove formed on the outer circumferential surface of the bobbin 120. The first coil 150 may face the first magnet 160. The first coil 150 may electromagnetically interact with the first magnet 160. In this case, when a current is supplied to the first coil 150 and a magnetic field is formed around the first coil 150, the first coil 150 and the first magnet 160 are subjected to an electromagnetic interaction. The coil 150 may move with respect to the first magnet 160. The first coil 150 may move for AF driving.

The lens module 100 may comprise a housing 115. The housing 115 may be disposed inside the first cover member 110. The housing 115 may be disposed outside the bobbin 120. An opening may be formed in the housing 115. The bobbin 120 may be disposed in the opening of the housing 115. The first support member 190 may be coupled to the housing 115. A first upper support member 192 may be coupled to an upper surface of the housing 115, and a first lower support member 194 may be coupled to a lower surface of the housing 115. The first magnet 160 may be coupled to an inner side surface of the housing 115.

The driving unit may comprise a first magnet 160. The first magnet 160 may be disposed between the first coil 150 and the bobbin 120 and the first cover member 110. The first magnet 160 may be coupled to a component such as a housing 115 disposed between the bobbin 120 and the first cover member 110. The first magnet 160 may face the first coil 150. The first magnet 160 may face the first coil 150 in a direction perpendicular to the optical axis. The first magnet 160 may electromagnetically interact with the first coil 150. The first magnet 160 may move the bobbin 120 on which the first coil 150 is wound. The first magnet 160 may move the first coil 150 for AF driving. The first magnet 160 may face the second coil 170. The first magnet 160 may face the second coil 170 in the optical axis direction. The first magnet 160 may electromagnetically interact with the second coil 170. The first magnet 160 may move the second coil 170. The first magnet 160 may move the second coil 170 for OIS driving. The first magnet 160 may comprise a plurality of first magnets. Each of the plurality of first magnets may be disposed to be spaced apart from each other. In another embodiment of the present invention, the four first magnets are described as being disposed at each inner side corner of the housing 115 as an example, but the number and arrangement of the first magnets 160 are not limited thereto and may be variously changed.

The lens module 100 may include a substrate 140. The substrate 140 may be disposed under the bobbin 120. The substrate 140 may be disposed inside the first cover member 110. A second coil 170 may be disposed on the substrate 140. The substrate 140 may be coupled to the bobbin 120. The substrate 140 may include a substrate hole 142. The bobbin 120 may be coupled to the substrate hole 142. The substrate 140 may be electrically connected to the first coil 150 and the second coil 170. The second coil 170 may be mounted on the substrate 140 in a pattern shape.

The driving unit may comprise a second coil 170. The second coil 170 may be disposed on the substrate 140. The second coil 170 may be mounted on the substrate 140 in a pattern shape. The second coil 170 may face the first magnet 160. The second coil 170 may be overlapped with the first magnet 160 in the optical axis direction. The second coil 170 may electromagnetically interact with the first magnet 160. When a current is supplied to the second coil 170, the second coil 170 may interact electromagnetically with the first magnet 160. The second coil 170 may perform OIS driving by electromagnetic interaction of the first magnet 160. The second coil 170 may comprise a plurality of second coils. Each of the plurality of second coils may be disposed to be spaced apart from each other. In another embodiment of the present invention, the four second coils are described as being disposed at each corner of the upper surface of the substrate 140, but are not limited thereto, and the number and arrangement of the second coils 170 may be variously changed.

The lens module 100 may comprise a first filter 180. The first filter 180 may be an infrared filter. The first filter 180 may block the light in the infrared region incident to the image sensor 230. The first filter 180 may be disposed between the lens 130 and the second cover glass 196. The first filter 180 may be formed of a film material or a glass material. The first filter 180 may be formed by coating an infrared cut-off coating material on a flat optical filter such as a cover glass or cover glass for protecting an imaging surface. As an example, the first filter 180 may be an infrared absorption filter (Blue filter) that absorbs infrared rays. As another example, the first filter 180 may be an IR cut filter that reflects infrared rays.

The lens module 100 may comprise a first support member 190. The first support member 190 may elastically support the bobbin 120 for AF driving and/or OIS driving. The first support member 190 may comprise a first upper support member 192 and a first lower support member 194. The first upper support member 192 may be coupled to an upper portion of the bobbin 120 and an upper portion of the housing 115. The first lower support member 194 may be coupled to a lower portion of the bobbin 120 and a lower portion of the housing 115. The first upper support member 192 and the first lower support member 194 may be connected through a first connection support member.

The lens module 100 may comprise a lens cover glass 196. The lens cover glass 196 may be coupled to the lower end of the lateral plate 114 of the first cover member 110. The lens cover glass 196 may comprise a hole. The light passing through the lens 130 may pass through the hole of the lens cover glass 196 and be irradiated to the sensor module 200. The lens cover glass 196 may be disposed at a position facing the first cover glass 32. The lens cover glass 196 may be coupled to the first cover glass 32, or may not be coupled and may be spaced apart from the first cover glass 32 by a predetermined distance. The lens cover glass 196 may be formed of the same material as the first cover glass 32.

The sensor module 200 may comprise a second cover member 210. The second cover member 210 may form the external appearance of the sensor module 200. The second cover member 210 may have a hexahedral shape with an open lower portion, but is not limited thereto and may be variously changed. The second cover member 210 may be a non-magnetic material. If the second cover member 210 is provided with a magnetic material, the magnetic force of the second magnet 260 may be affected. The second cover member 210 may be formed of a metal material. In more detail, the second cover member 210 may be formed of a metal plate. In this case, the second cover member 210 may block electromagnetic interference (EMI). Because of this characteristic of the second cover member 210, the second cover member 210 may be referred to as an 'EMI shield can'. The second cover member 210 may be connected to the ground portion of the printed circuit board 220. Through this, the second cover member 210 may be grounded. The second cover member 210 may block radio waves generated from the outside of the sensor module 200 from being introduced into the second cover member 210. In addition, the second cover member 210 may block radio waves generated inside the second cover member 210 from being radiated to the outside of the second cover member 210. However, the material of the second cover member 210 is not limited thereto and may be variously changed.

The second cover member 210 may comprise a second upper plate 212 and a second lateral plate 214. The second cover member 210 may comprise a second upper plate 212 and a second lateral plate 214 being extended from an outer side to a lower side of the second upper plate 212. In the inner space formed by the second cover member 210, a coupling member 215, a printed circuit board 220, an image sensor 230, a base 240, a third coil 250, a second magnet 260, a fourth coil 270, a second filter 280 and a second support member 290 may be disposed. The second cover member 210 may protect internal components from external impacts and inhibit penetration of external contaminants.

The second cover member 210 may comprise an opening (hole) formed in the second upper plate 212. The opening of the second cover member 210 allows light passing through the lens module 100 to be irradiated to the image sensor 230.

The sensor module 200 may include a printed circuit board 220. The printed circuit board 220 may be disposed inside the second cover member 210. The printed circuit board 220 may be electrically connected to the third coil 250 and the fourth coil 270, the Hall sensor 300, and the control unit. The printed circuit board 220 may supply power (current) to the third coil 250 and the fourth coil 270, the Hall sensor 300, and the control unit. The control unit may be disposed on the printed circuit board 220. The image sensor 230 may be disposed on the printed circuit board 220. The printed circuit board 220 may be electrically connected to the image sensor 230. A light that has passed through the lens module 100 and reflected by the reflective member 1400 may be irradiated to the image sensor 230 mounted on the printed circuit board 220.

The sensor module 200 may comprise an image sensor 230. The image sensor 230 may be disposed on the printed circuit board 220. The image sensor 230 may be electrically connected to the printed circuit board 220. For example, the image sensor 230 may be coupled to the printed circuit board 220 by a surface mounting technology (SMT). As another example, the image sensor 230 may be coupled to the printed circuit board 220 by flip chip technology. The image sensor 230 may be aligned so that the optical axis and the optical axis of the lens module 100 coincide. That is, the optical axis of the image sensor 230 and the optical axis of the lens module 100 may be aligned. Through this, the image sensor 230 may acquire a light pass through the lens module 100 and reflected from the reflective member 1400. The image sensor 230 may convert light irradiated to the effective image area of the image sensor 230 into an electrical signal. The image sensor 230 may be any one of a charge coupled device (CCD), a metal oxide semiconductor (MOS), a CPD, and a CID. However, the type of the image sensor 230 is not limited thereto, and the image sensor 230 may comprise any component capable of converting incident light into an electrical signal.

The sensor module 200 may comprise a base 240. The third coil 250 may be disposed on an outer circumferential surface of the base 240. The third coil 250 may be wound on an outer circumferential surface of the base 240. The base 240 may comprise a coupling groove on an outer circumferential surface. The third coil 250 may be disposed in the coupling groove of the base 240. The base 240 may comprise a coupling hole. The printed circuit board 220 may be coupled to the coupling hole of the base 240. The coupling hole of the base 240 may be formed in a shape corresponding to the printed circuit board 220. The second support member 290 may be coupled to the base 240. The second upper support member 292 may be coupled to an upper surface of the base 240, and the second lower support member 294 may be coupled to a lower surface of the base 240. The base 240 may move in the optical axis direction with respect to the second cover member 210. The base 240 may move in a direction perpendicular to the optical axis direction with respect to the second cover member 210. The base 240 may move in a direction perpendicular to the optical axis direction and the optical axis direction with respect to the second cover member 210. The base 240 may be moved by an electromagnetic interaction between the third coil 250 and the second magnet 260 and/or an electromagnetic interaction between the second magnet 260 and the fourth coil 270.

In another embodiment of the present invention, the base 240 is described as an example formed in a rectangular ring shape, but the shape of the base 240 is not limited thereto and may be variously changed.

The driving unit may comprise a third coil 250. The third coil 250 may be disposed on the base 240. The third coil 250 may be wound on an outer circumferential surface of the base 240. The third coil 250 may be disposed in a coupling groove formed on an outer circumferential surface of the base 240. The third coil 250 may face the second magnet 260. The third coil 250 may electromagnetically interact with the second magnet 260. In this case, when current is supplied to the third coil 250 and a magnetic field is formed around the third coil 250, the third coil 250 may move with respect to the second magnet by the magnetic interaction between the third coil 250 and the second magnet 260. The third coil 250 may move for AF driving.

The sensor module 200 may comprise a coupling member 215. The coupling member 215 may be disposed outside the base 240. The coupling member 215 may comprise a through hole. The base 240 may be disposed in the through hole of the coupling member 215. A second magnet 260 may be disposed on the coupling member 215. The coupling member 215 may comprise a coupling groove formed on an outer circumferential surface. The second magnet 260 may be coupled to a coupling groove of the coupling member 215. The second support member 290 may be coupled to the coupling member 215. A second upper support member 292 may be coupled to an upper portion of the coupling member 215, and a second lower support member 294 may be coupled to a lower portion of the coupling member 215. In another embodiment of the present invention, the coupling member 215 is described as an example formed in a rectangular ring shape, but the shape of the coupling member 215 is not limited thereto and may be variously changed.

The driving unit may comprise a second magnet 260. The second magnet 260 may be disposed between the third coil 250 and the base 240 and the second cover member 210. The second magnet 260 may be coupled to a component such as a coupling member 215 disposed between the base 240 and the second cover member 210. The second magnet 260 may face the third coil 250. The second magnet 260 may face the third coil 250 in a direction perpendicular to the optical axis. The second magnet 260 may electromagnetically interact with the third coil 250. The second magnet 260 may move the base 240 on which the third coil 250 is wound. The second magnet 260 may move the third coil 250 for AF driving. The second magnet 260 may face the fourth coil 270. The second magnet 260 may face the fourth coil 270 in the optical axis direction. The second magnet 260 may electromagnetically interact with the fourth coil 270. The second magnet 260 may move the fourth coil 270. The second magnet 260 may move the fourth coil 270 for OIS driving. The second magnet 260 may comprise a plurality of second magnets. Each of the plurality of second magnets may be disposed to be spaced apart from each other. In another embodiment of the present invention, the four second magnets are described as being disposed on each side of the coupling member 215, but are not limited thereto, and the number and arrangement of the second magnets 260 may be variously changed.

The driving unit may comprise a fourth coil 270. The fourth coil 270 may be mounted in a pattern shape on a coil substrate connected to the printed circuit board 220. The fourth coil 270 may face the second magnet 260. The fourth coil 270 may be overlapped with the second magnet 260 in the optical axis direction. The fourth coil 270 may electromagnetically interact with the second magnet 260. When current is supplied to the fourth coil 270, the fourth coil 270 may electromagnetically interact with the second magnet 260. The fourth coil 270 may perform OIS driving through electromagnetic interaction with the second magnet 260. The fourth coil 270 may comprise a plurality of fourth coils. Each of the plurality of fourth coils may be disposed to be spaced apart from each other. In another embodiment of the present invention, the four fourth coils are described as being disposed on an upper surface of the coil substrate, but the number and arrangement of the fourth coils 270 are not limited thereto and may be variously changed. In addition, the fourth coil 270 may be coupled to another component as a component other than a pattern coil for OIS driving of the printed circuit board 220 and the image sensor 230 mounted on the printed circuit board 220.

The sensor module 200 may comprise a second filter 280. The second filter 280 may be an infrared filter. The second filter 280 may block the light in the infrared region from being incident to the image sensor 230. The second filter 280 may be disposed between the image sensor 230 and the second cover member 210. The second filter 280 may be formed of a film material or a glass material. The second filter 280 may be formed by coating an infrared cut-off coating material on a flat optical filter such as a cover glass or cover glass for protecting an imaging surface. For example, the second filter 280 may be an infrared absorption filter (Blue filter) absorbing infrared rays. As another example, the second filter 280 may be an IR cut filter that reflects infrared rays.

The sensor module 200 may comprise a second support member 290. The second support member 290 can support the base 240 for AF driving and/or OIS driving. The second support member 290 may comprise a second upper support member 292 and a second lower support member 294. The second upper support member 292 may be coupled to an upper portion of the base 240 and an upper portion of the member 215. The second lower support member 294 may be coupled to a lower portion of the base 240 and a lower portion of the coupling member 215. The second upper support member 292 and the second lower support member 294 may be connected through the second connection support member.

A Hall sensor 300 may be disposed on the sensor module 200. The Hall sensor 300 may be disposed on the second upper plate 212 of the second cover member 210. The Hall sensor 300 may measure a degree of distortion between the optical axis of the lens module 100 and the optical axis of the sensor module 200. In this case, the Hall sensor 300 may measure the degree of distortion of the optical axis of the lens module 100 and the optical axis of the sensor module 200 in the optical axis direction and/or in a direction perpendicular to the optical axis direction.

The optical device 10 may comprise a control unit. The control unit may be disposed on the printed circuit board 220. The control unit may output a signal supplying current to the first to fourth coils 150, 170, 250, and 270. The control unit may receive information on a degree to which the optical axis of the lens module 100 detected by the Hall sensor 300 and the optical axis of the sensor module 200 are distorted. The control unit supplies current to the first to fourth coils 150, 170, 250, and 270 based on the degree of misalignment between the optical axis of the lens module 100 and the optical axis of the sensor module 200, so that a signal for aligning (correcting) the optical axis of the lens module 100 and the optical axis of the sensor module 200 may be outputted. In addition, the control unit may output a signal for aligning (correcting) the optical axis of the lens module 100 and the optical axis of the sensor module 200 when the camera is turned on, or when the main bodies 20 and 30 are folded and the sensor module 100 and the lens module 200 face each other.

According to an embodiment of the present invention, when the first main body 30 and the second main body 20 are folded, a picture is photographed in a normal mode, and when the first main body 30 and the second main body 20 are unfolded, since at least a portion of the lens module 100 is disposed on the first main body 30, a wide-angle mode can be implemented, thereby reducing the components and cost. The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:

1. An optical device comprising:
   a first main body comprising a first hole;
   a second main body comprising a second hole and connected to the first main body in a foldable manner;
   a sensor module disposed to be fixed to the first hole;
   a sensor disposed on the sensor module;
   a lens module disposed to be movable in an optical axis direction above the sensor module;
   a transparent member disposed on the second hole; and
   an elastic member connected to a lower surface of the lens module and to an upper surface of the sensor module,
   wherein the lens module is disposed in the first hole when the first main body and the second main body are folded,
   wherein at least a portion of the lens module is disposed above the first hole when the first main body and the second main body are unfolded,
   wherein the lens module comprises a substrate and a first coil disposed on the substrate,
   wherein the sensor is overlapped with the first coil in the optical axis direction,
   wherein the lens module comprises a first magnet,
   wherein the sensor module comprises a second magnet,
   wherein the first coil is disposed between the first magnet and the second magnet in the optical axis direction,
   wherein the elastic member is compressed when the first main body and the second main body are folded, and
   wherein the elastic member is restored when the first main body and the second main body are unfolded.

2. The optical device of claim 1, wherein the lens module is disposed in the first hole by the second main body when the first main body and the second main body are folded, and
   wherein at least a portion of the lens module is disposed above the first hole by the elastic member when the first main body and the second main body are unfolded.

3. The optical device of claim 1, wherein the lens module comprises:
   a first cover member comprising a first upper plate comprising a hole and a first side plate extending downward from the first upper plate;
   a bobbin disposed in the first cover member and on the substrate;
   a lens disposed inside the bobbin;
   a second coil disposed on the bobbin; and
   a first support member elastically supporting the bobbin at an upper portion and a lower portion of the bobbin,
   wherein the first magnet is disposed between the second coil and the first side plate and facing the second coil.

4. The optical device of claim 3, wherein the sensor is a Hall sensor.

5. The optical device of claim 1, wherein the sensor module comprises:
   a second cover member comprising a second upper plate comprising a hole and a second side plate extending downward from the second upper plate;
   a printed circuit board disposed in the second cover member;
   an image sensor mounted on the printed circuit board;
   a base supporting the printed circuit board;
   a third coil disposed on the base;
   a fourth coil disposed under the second magnet; and
   a second elastic member elastically supporting the base at an upper portion and a lower portion of the base,
   wherein the second magnet is disposed between the third coil and the second side plate and facing the third coil.

6. The optical device of claim 1, wherein the sensor is a Hall sensor for measuring a distortion of an optical axis of the lens module and an optical axis of the sensor module.

7. The optical device of claim 6, comprising a control unit outputting a control signal for correcting the distortion of the optical axis measured at the Hall sensor.

8. The optical device of claim 1, wherein the first hole and the second hole are overlapped in the optical axis direction, when the first main body and the second main body are folded.

9. The optical device of claim 1, wherein the second main body covers the lens module, when the first main body and the second main body are folded.

10. The optical device of claim 1, wherein the lens module is overlapped with the transparent member in the optical axis direction, when the first main body and the second main body are folded.

11. The optical device of claim 1, wherein a distal end of the first main body is contacted with a distal end of the second main body, when the first main body and the second main body are folded.

12. The optical device of claim 1, wherein the lens module comprises a lens and the first magnet is configured to move the lens,
wherein the sensor module comprises an image sensor and the second magnet is configured to move the image sensor, and
wherein the first magnet is overlapped with the second magnet in the optical axis direction.

13. The optical device of claim 1, wherein the lens module comprises a lens and a first filter,
wherein the sensor module comprises an image sensor and a second filter, and
wherein the first filter and the second filter are disposed between the lens and the image sensor.

14. An optical device comprising:
a main body comprising a first main body and a second main body foldably connected to the first main body;
a sensor module disposed in the first main body;
a sensor disposed on the sensor module;
a lens module coupled to the first main body and configured to move in an optical axis direction; and
an elastic member connected to a lower surface of the lens module and to an upper surface of the sensor module,
wherein the lens module is contacted with the second main body when the first main body and the second main body are folded,
wherein the lens module comprises a substrate and a first coil disposed on the substrate,
wherein the sensor is overlapped with the first coil in the optical axis direction,
wherein the lens module comprises a first magnet,
wherein the sensor module comprises a second magnet,
wherein the first coil is disposed between the first magnet and the second magnet in the optical axis direction,
wherein the elastic member is compressed when the first main body and the second main body are folded, and
wherein the elastic member is restored when the first main body and the second main body are unfolded.

15. The optical device of claim 14, wherein a distal end of the first main body is contacted with a distal end of the second main body when the first main body and the second main body are folded.

16. The optical device of claim 14, wherein the lens module comprises a lens and the first magnet is configured to move the lens,
wherein the sensor module comprises an image sensor and the second magnet is configured to move the image sensor, and
wherein the first magnet is overlapped with the second magnet in the optical axis direction.

17. The optical device of claim 14, wherein the lens module comprises a lens and a first filter,
wherein the sensor module comprises an image sensor and a second filter, and
wherein the first filter and the second filter are disposed between the lens and the image sensor.

18. An optical device comprising:
a first main body comprising a first hole;
a second main body comprising a second hole and connected to the first main body in a foldable manner;
a sensor module disposed to be fixed to the first hole;
a sensor disposed on the sensor module;
a lens module disposed to be movable in an optical axis direction above the sensor module;
a transparent member disposed on the second hole;
a first cover member comprising a first upper plate comprising a hole and a first side plate extending downward from the first upper plate;
a bobbin disposed in the first cover member and on a substrate;
a lens disposed inside the bobbin; a second coil disposed on the bobbin; and a first support member elastically supporting the bobbin at an upper portion and a lower portion of the bobbin, wherein the lens module is disposed in the first hole when the first main body and the second main body are folded, wherein at least a portion of the lens module is disposed above the first hole when the first main body and the second main body are unfolded, wherein the lens module comprises the substrate and a first coil disposed on the substrate, wherein the sensor is overlapped with the first coil in the optical axis direction, wherein the lens module comprises a first magnet, wherein the sensor module comprises a second magnet, wherein the first coil is disposed between the first magnet and the second magnet in the optical axis direction, and wherein the first magnet is disposed between the second coil and the first side plate and facing the second coil" in combination of other limitation in the claim.

* * * * *